July 10, 1934.  W. SINCLAIR  1,965,714
AUTOMATIC BORING AND FACING MACHINE
Filed Feb. 20, 1931  11 Sheets-Sheet 1
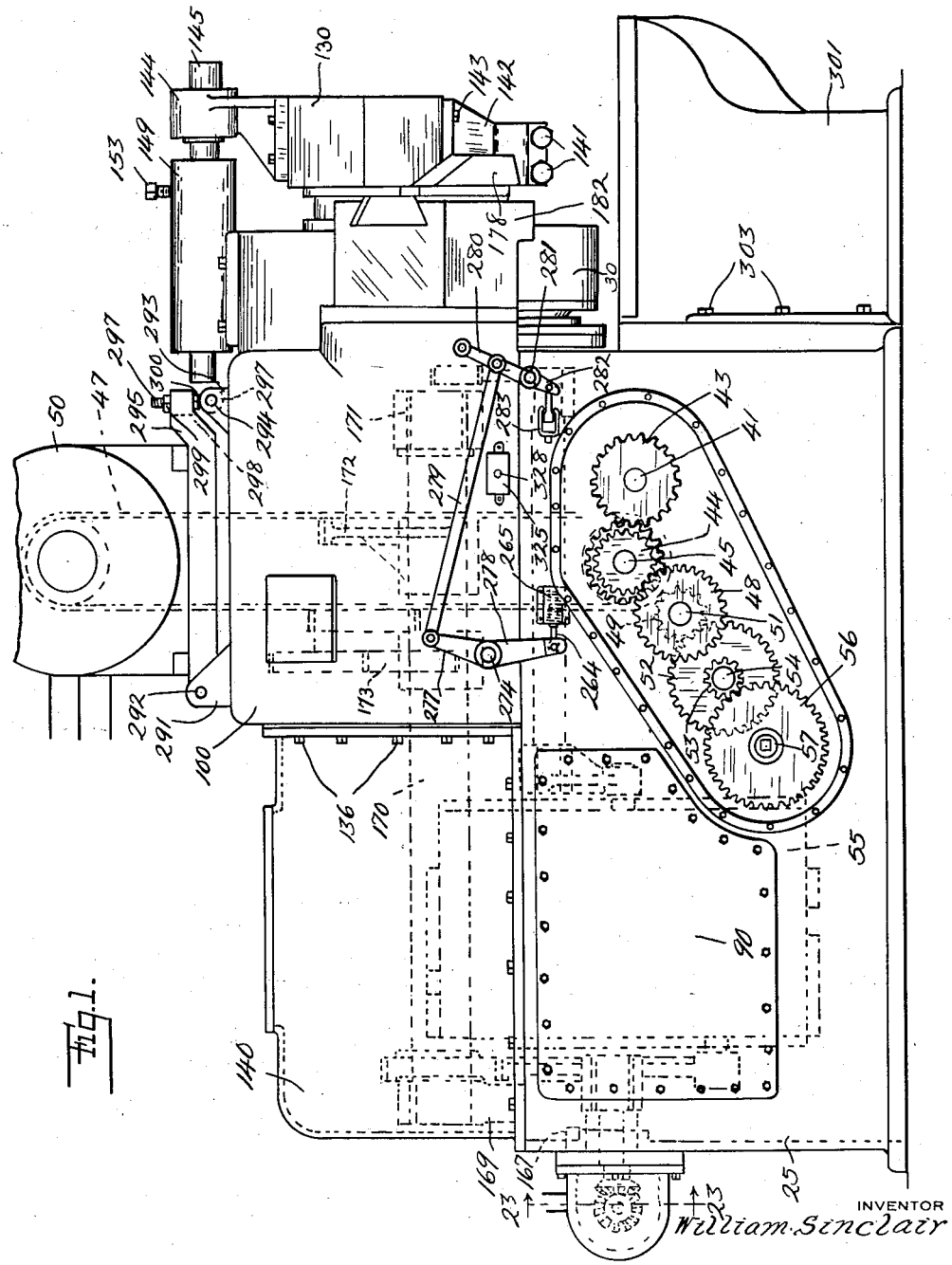
INVENTOR
William Sinclair
BY
Swan & Frye
ATTORNEYS

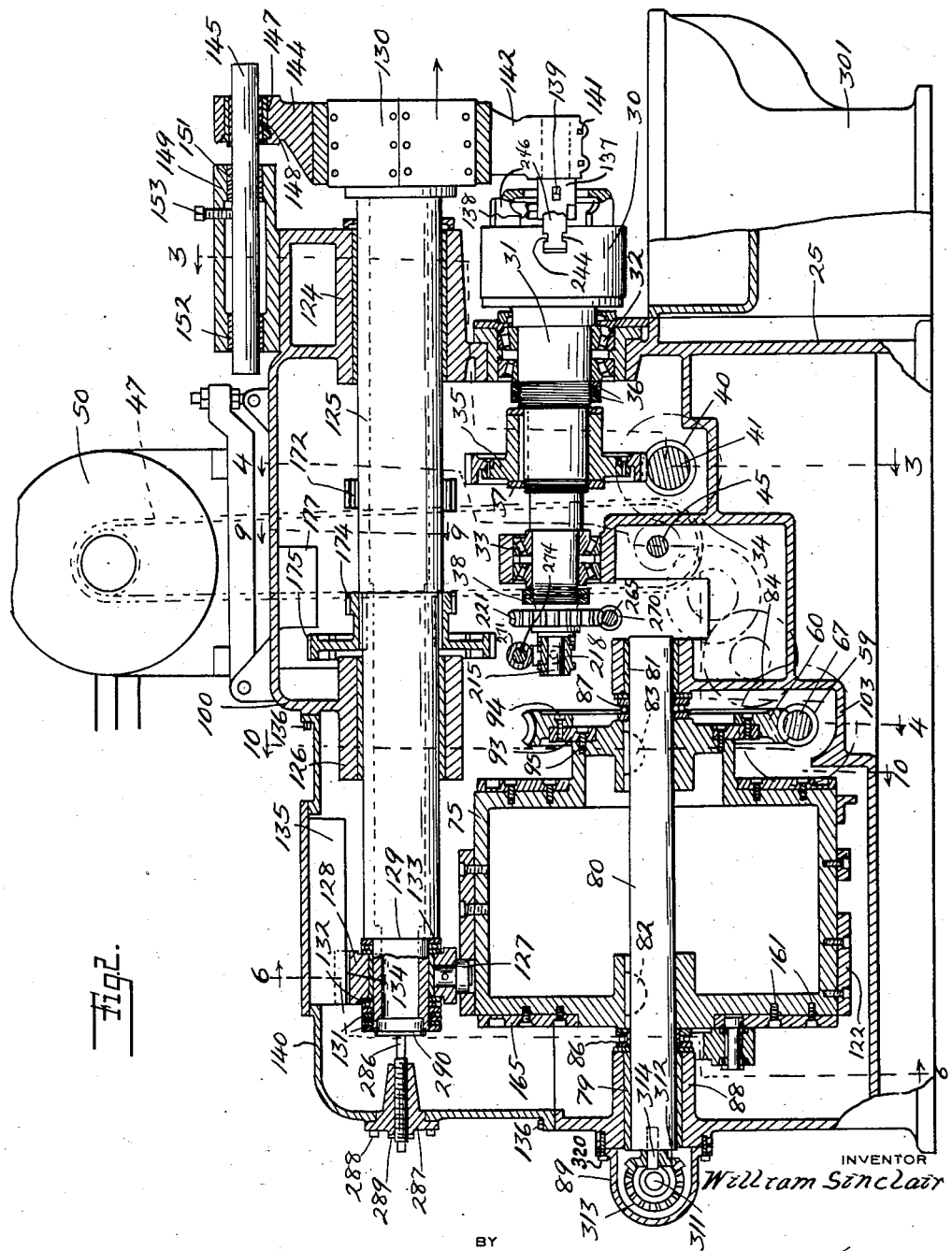

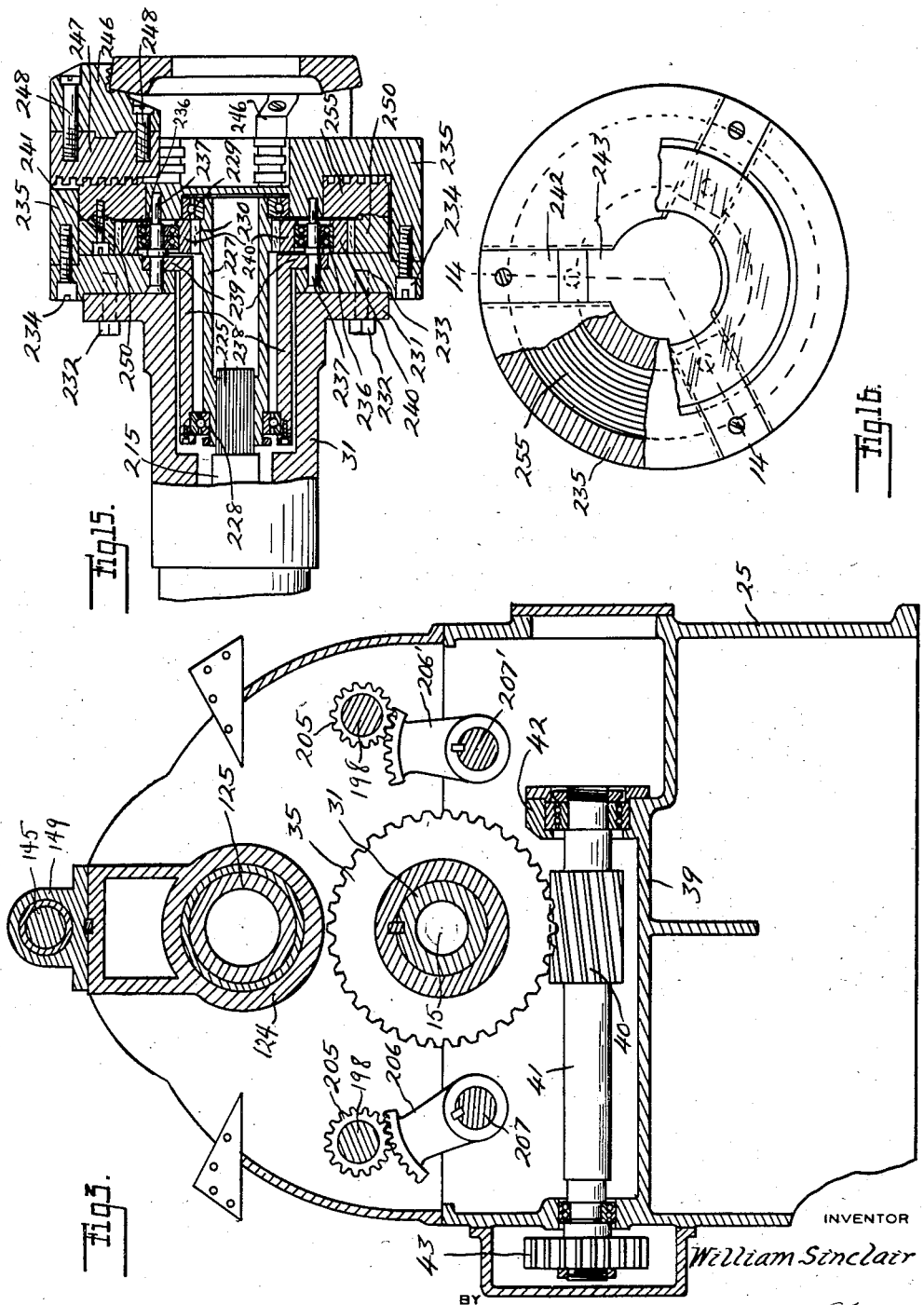

July 10, 1934.  W. SINCLAIR  1,965,714
AUTOMATIC BORING AND FACING MACHINE
Filed Feb. 20, 1931   11 Sheets-Sheet 4
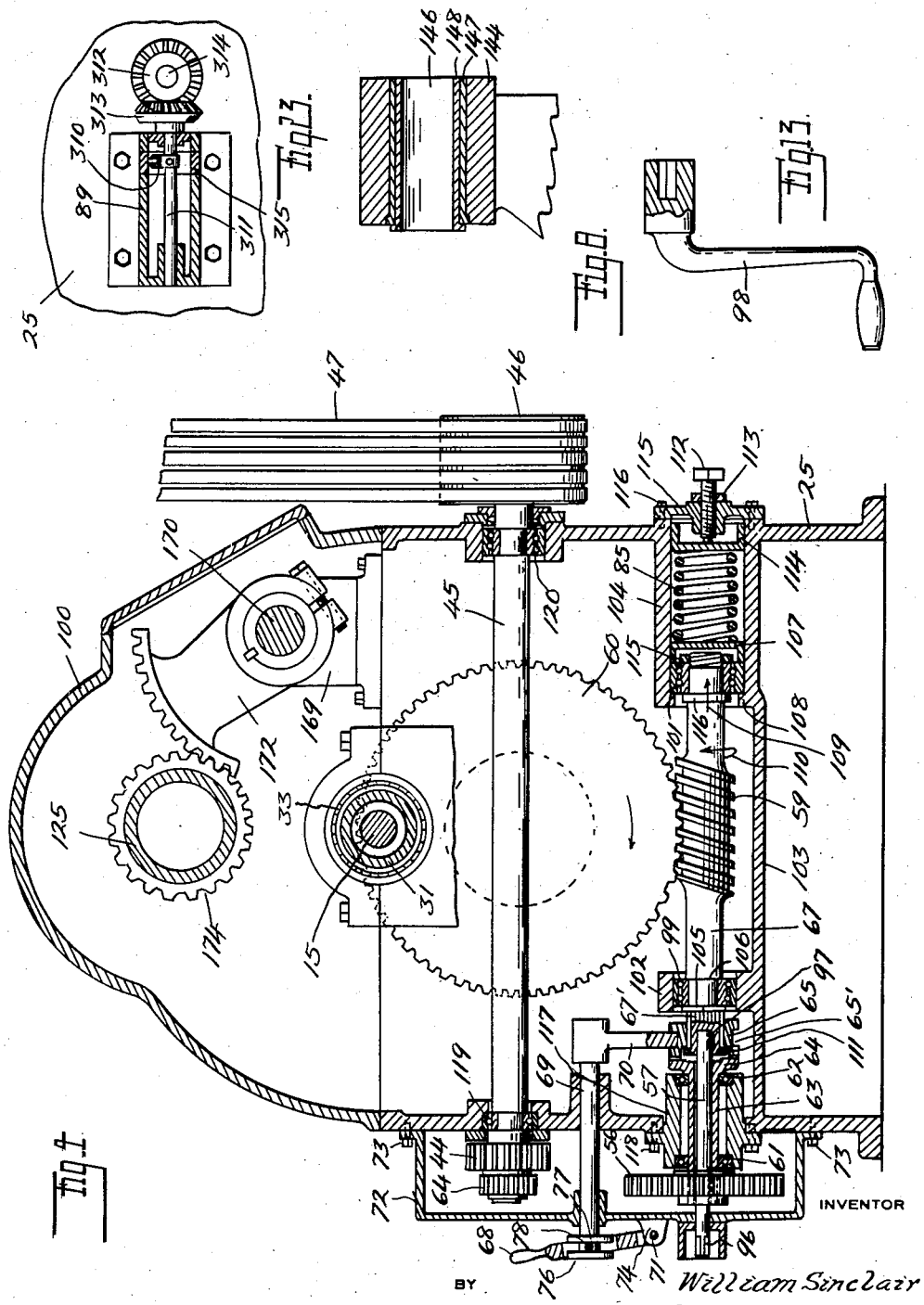
INVENTOR
William Sinclair
BY Swan + Frye
ATTORNEYS July 10, 1934.  W. SINCLAIR  1,965,714
AUTOMATIC BORING AND FACING MACHINE
Filed Feb. 20, 1931  11 Sheets-Sheet 5
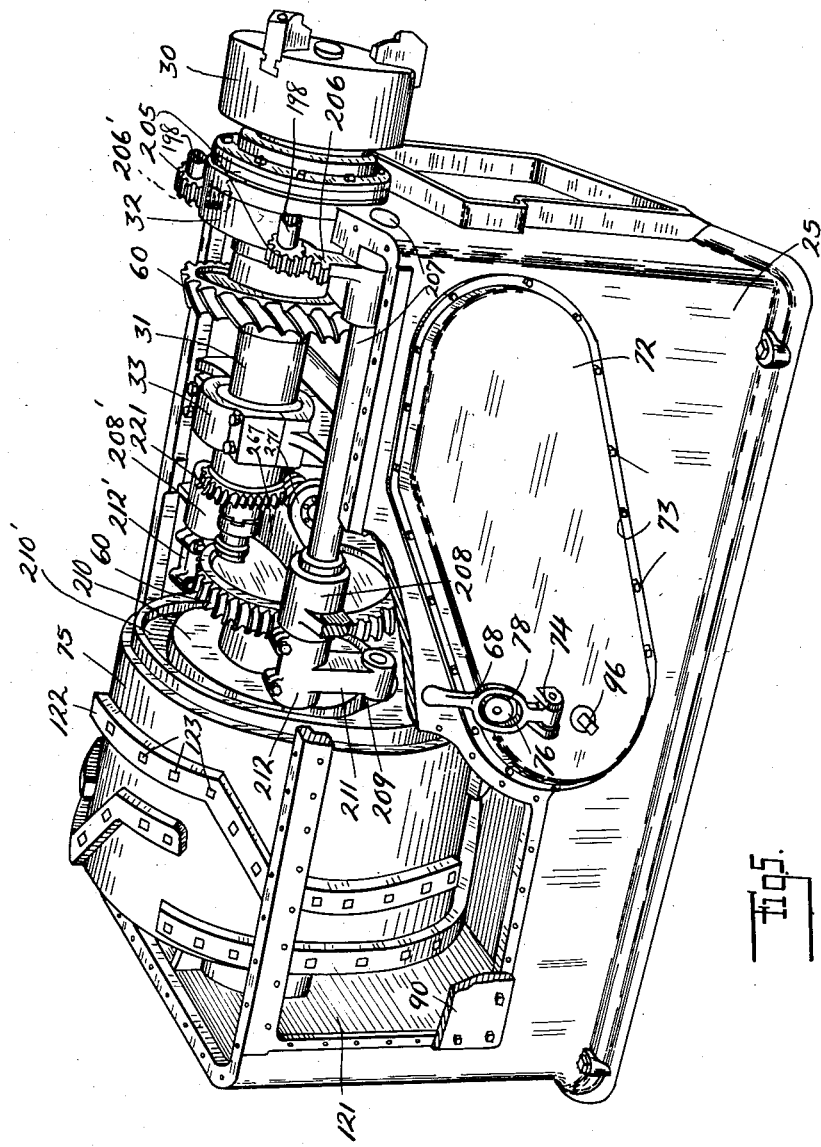
INVENTOR
William Sinclair
BY
Swan & Frye
ATTORNEYS

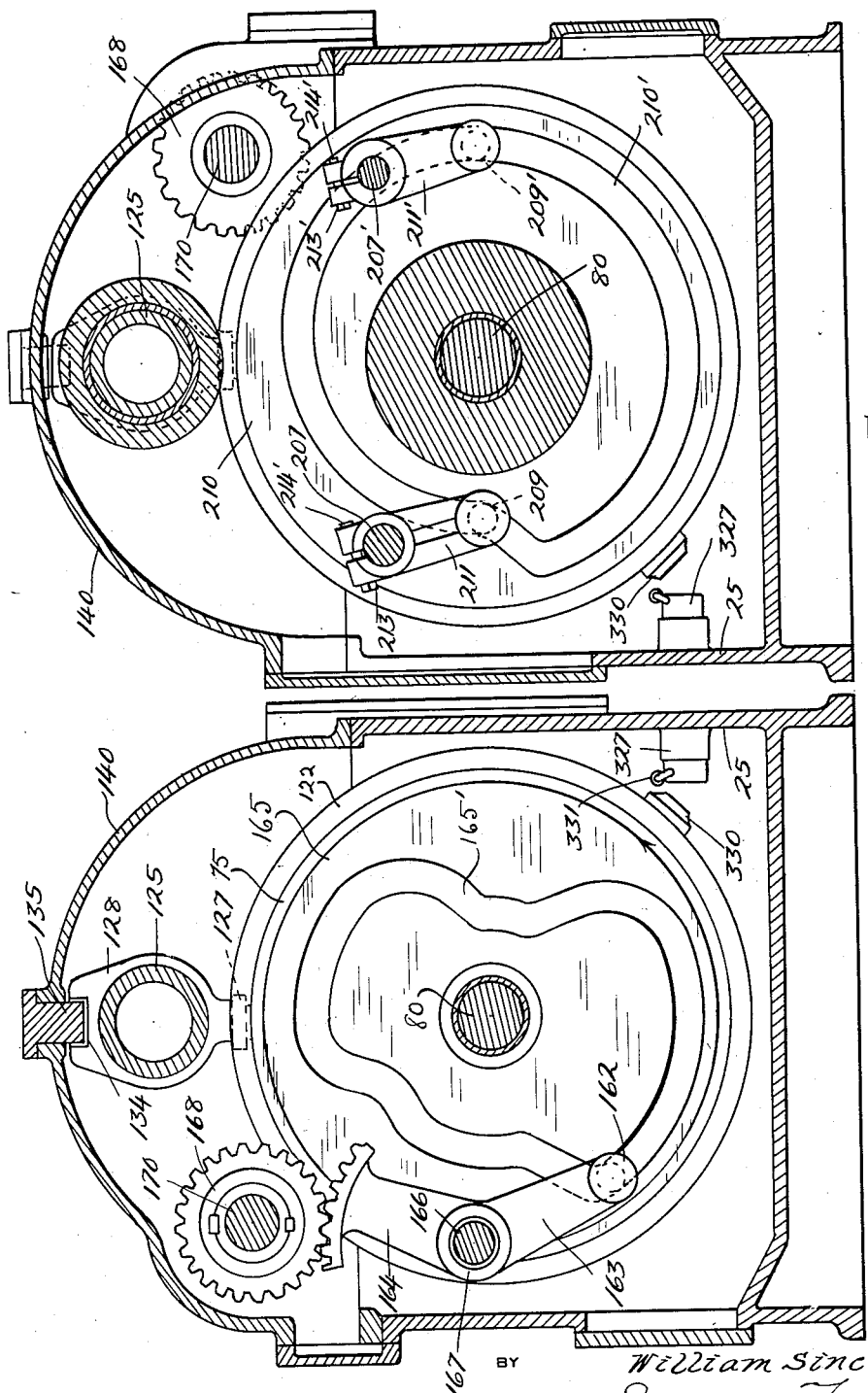

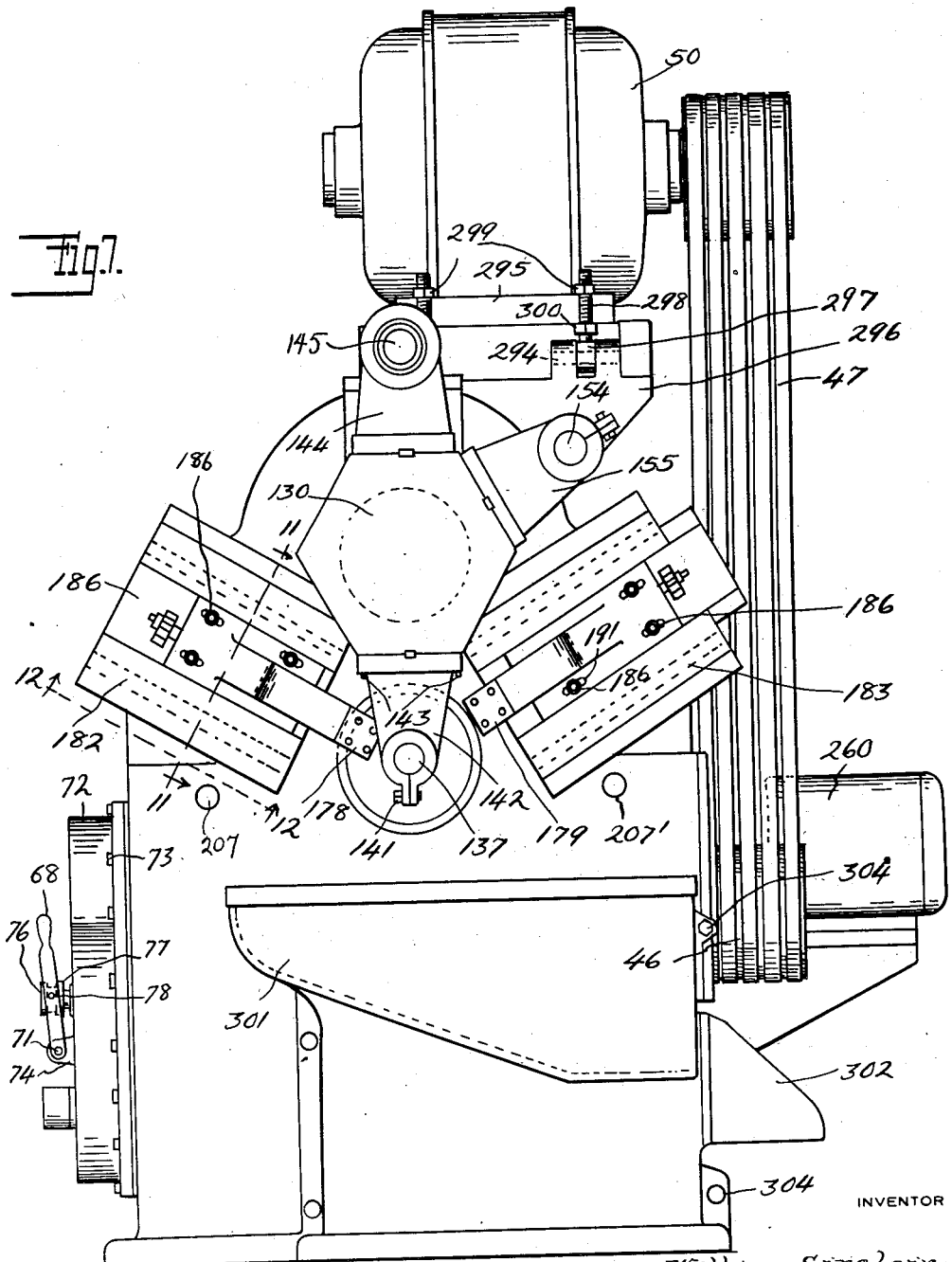

July 10, 1934.  W. SINCLAIR  1,965,714
AUTOMATIC BORING AND FACING MACHINE
Filed Feb. 20, 1931  11 Sheets-Sheet 8
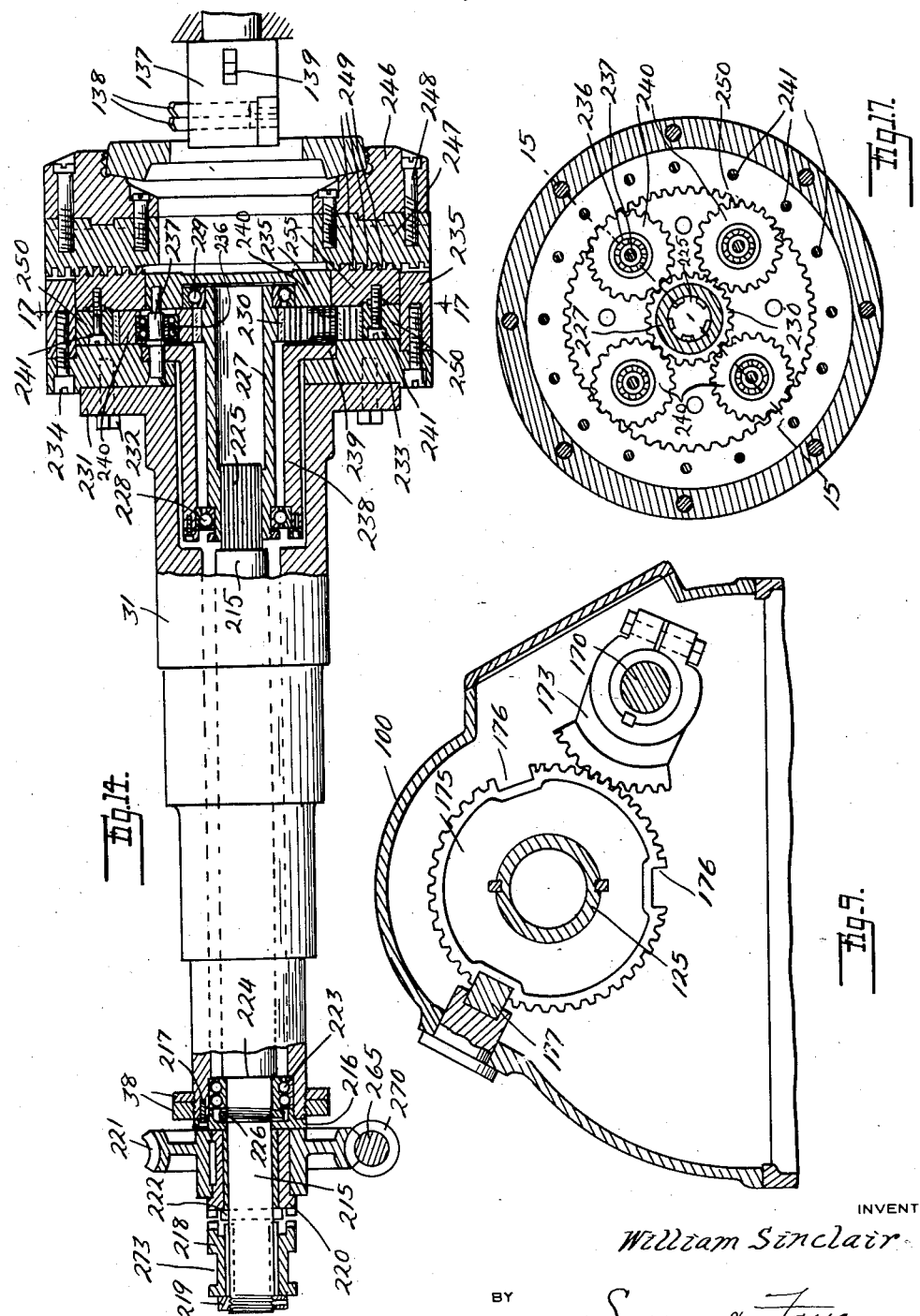
INVENTOR
William Sinclair
BY
Swan & Frye
ATTORNEYS

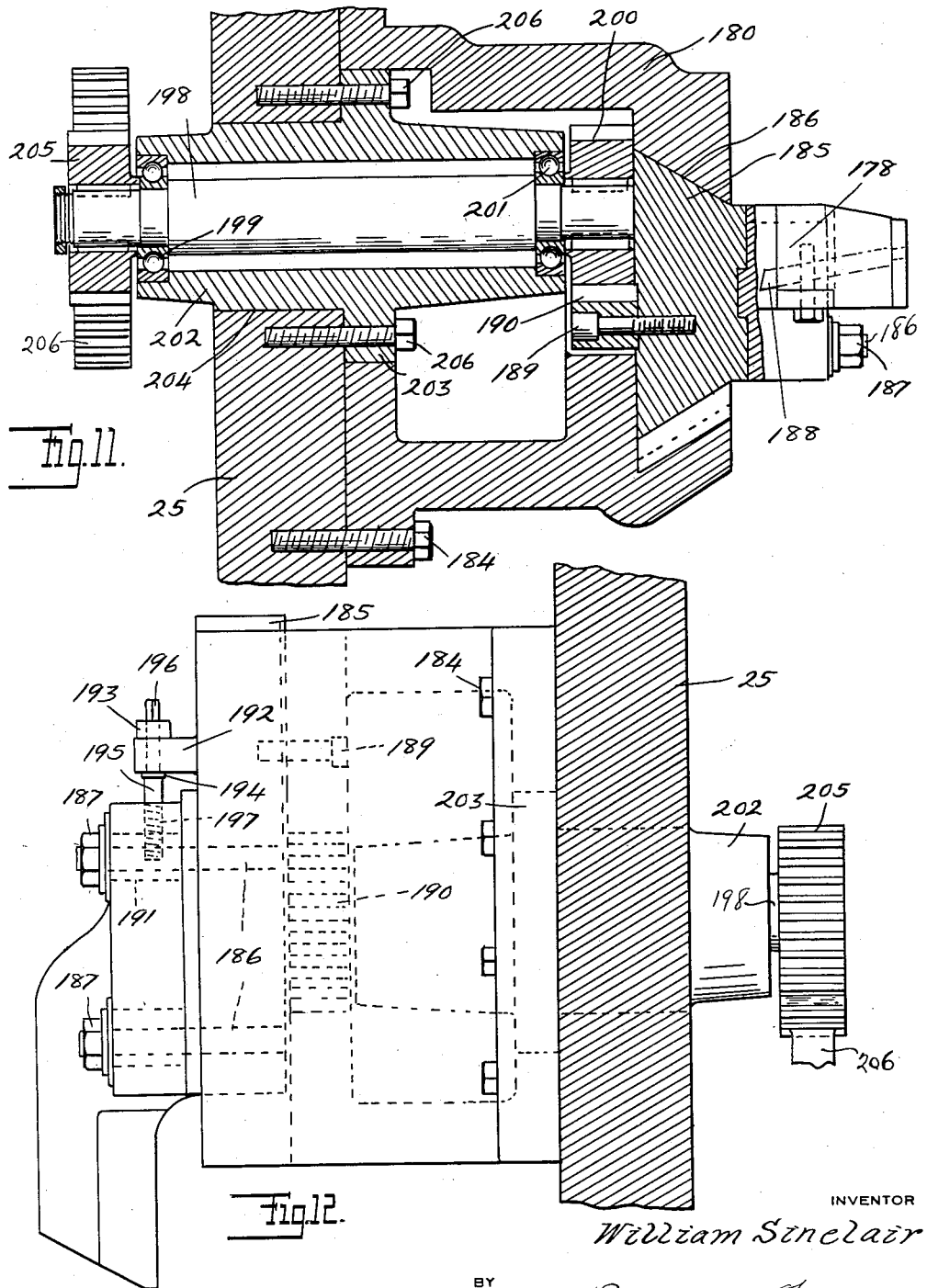

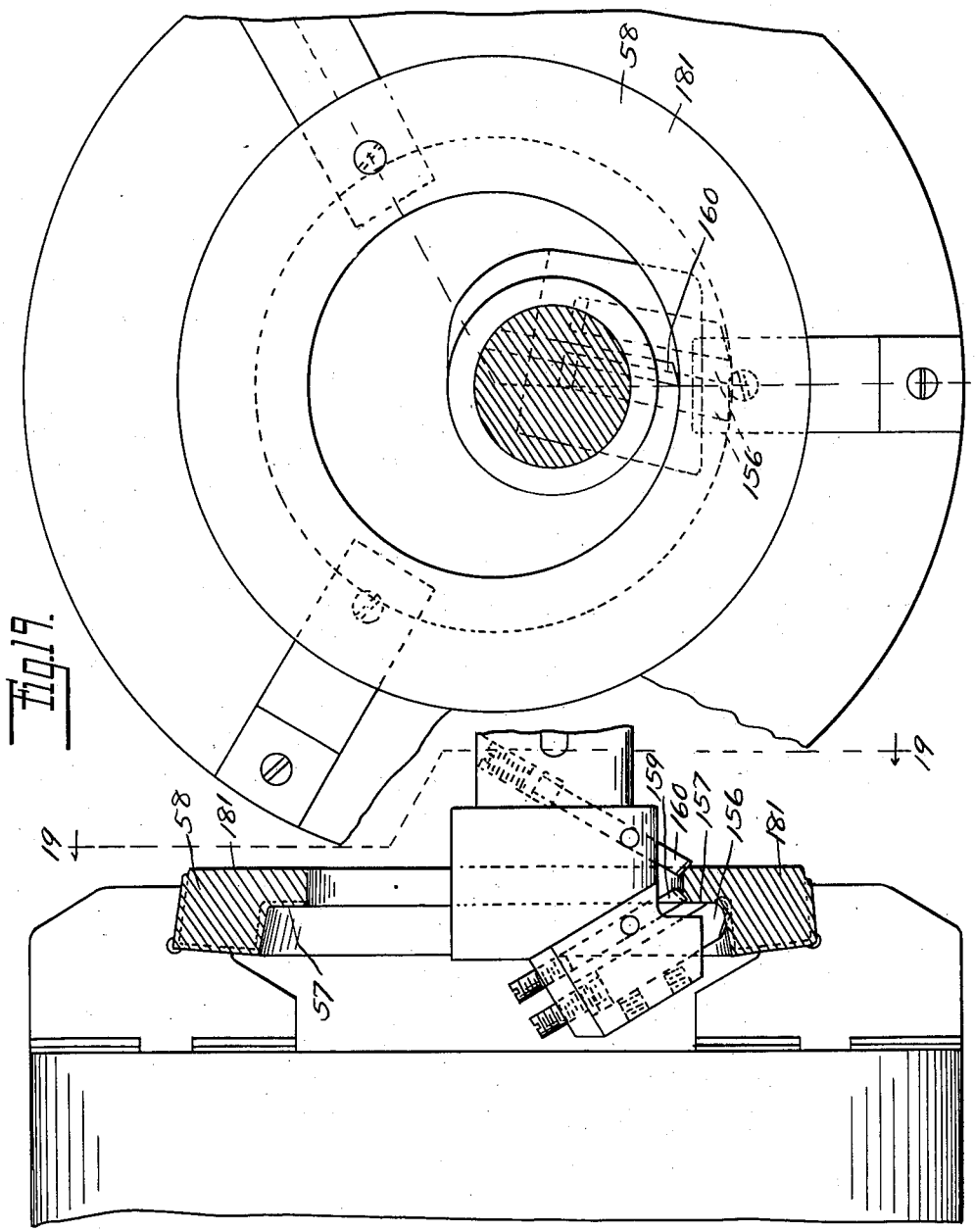

July 10, 1934.  W. SINCLAIR  1,965,714
AUTOMATIC BORING AND FACING MACHINE
Filed Feb. 20, 1931   11 Sheets-Sheet 11

INVENTOR
William Sinclair
BY
Swan & Frye
ATTORNEYS

Patented July 10, 1934

1,965,714

UNITED STATES PATENT OFFICE 1,965,714

AUTOMATIC BORING AND FACING MACHINE

William Sinclair, Detroit, Mich., assignor to Production Engineering Company, Detroit, Mich., a corporation of Michigan Application February 20, 1931, Serial No. 517,185

8 Claims. (Cl. 29—43)

This invention relates to automatic boring and facing machines, and has for one of its objects the provision of such a machine designed for continuous operation which will automatically bore and face, or mill in almost any other desired fashion, a metallic part which may be automatically grasped by the machine at the commencement of its operation upon the part, and released thereby when the same are completed.

A further object of this invention is the provision of such a device which will face opposite surfaces of the member being operated upon in a single operation, and without removing the work from the machine, and which will in the same continuous operation bore or drill the work in any desired manner.

Another object of this invention is the provision of such a machine in which the aforementioned operations, or any of them, or any of numerous others, may be performed without requiring the operator of the machine to do anything but load the work.

The principal object of the particular embodiment of my invention herein described is the provision of a machine for automatically boring and facing ring gear blanks, and preparing them for the thread-cutting operation by means of a single automatic machining device, in the running of which nothing else is required but the mechanical operation of feeding the work to the machine, the device, however, will be seen to be adaptable to machining or finishing an infinite variety of other classes of work.

It is also an object of my invention to provide a machine which will perform a plurality of desired operations, as of boring and facing, but which nevertheless has but a single spindle.

Other objects and advantages will be apparent from the following description, wherein reference is made to the accompanying drawings illustrating a preferred embodiment of my invention, and wherein similar reference numerals designate similar parts throughout the several views.

In the drawings:

Figure 1 is a side elevational view of a preferred form of a machine embodying my invention.

Figure 2 is a vertical longitudinal section taken substantially through the center thereof.

Figure 3 is a vertical transverse section taken substantially on the line 3—3 of Figure 2, and looking in the direction of the arrows.

Figure 4 is a vertical transverse cross section taken substantially on the line 4—4 of Figure 2.

Figure 5 is a perspective view of the lower portion of my improved boring and facing machine, portions of the side frame, the inspection plate, and the mechanism being broken away to afford better views of various parts.

Figure 6 is a vertical cross section taken substantially on the line 6—6 of Figure 2 and looking in the direction of the arrows.

Figure 7 is an end elevational view of my machine taken facing the head or turret end.

Figure 8 is a detail sectional view of the pilot bushing.

Figure 9 is a detail cross sectional view of a portion of the upper part of my machine taken substantially on the line 9—9 of Figure 2 and looking in the direction of the arrows.

Figure 10 is a vertical cross section taken substantially on the line 10—10 of Figure 2 and looking in the direction of the arrows.

Figure 11 is a detail fragmentary cross sectional view showing the construction of one of the independent tool mountings being taken substantially on the line 11—11 of Figure 7 and looking in the direction of the arrows.

Figure 12 is a fragmentary side elevational view of part of the same member, being taken substantially on the line 12—12 of Figure 7 looking in the direction of the arrows, and a portion of the housing being broken away to show the interior construction.

Figure 13 is a detail view of a crank member for manually driving the machine during adjustment thereof.

Figure 14 is a side view partly in elevation and partly in section of the main spindle of my machine, including a detail sectional view of my automatic chuck, which is taken substantially on the line 14—14 of Figure 16, and looking in the direction of the arrows, also showing the clutch and driving means for motivating the chuck jaws, and including a showing of work mounted in the chuck and a boring and reaming tool which is fragmentarily shown in a position preparatory to operating upon the work.

Figure 15 is a detail cross sectional view of my improved automatic chuck taken substantially on the line 15—15 of Figure 17.

Figure 16 is an end elevational view of the chuck member with a portion of its face plate broke away to afford a view of the driving scroll.

Figure 17 is an elevational view of a portion of the interior mechanism of my automatic chuck showing the planetary gear system, being taken substantially on the line 17—17 of Figure 14 and looking in the direction of the arrows.

Figure 18 is a fragmentary detail side view, partly in elevation and partly in section, of a portion of the chuck, showing work held by the chuck jaws and the facing tool in position to perform machining operations thereupon.

Figure 19 is a fragmentary end elevational view taken substantially on the line 19—19 of Figure 18 and looking in the direction of the arrows, the tool shank being shown in section.

Figures 20, 22:
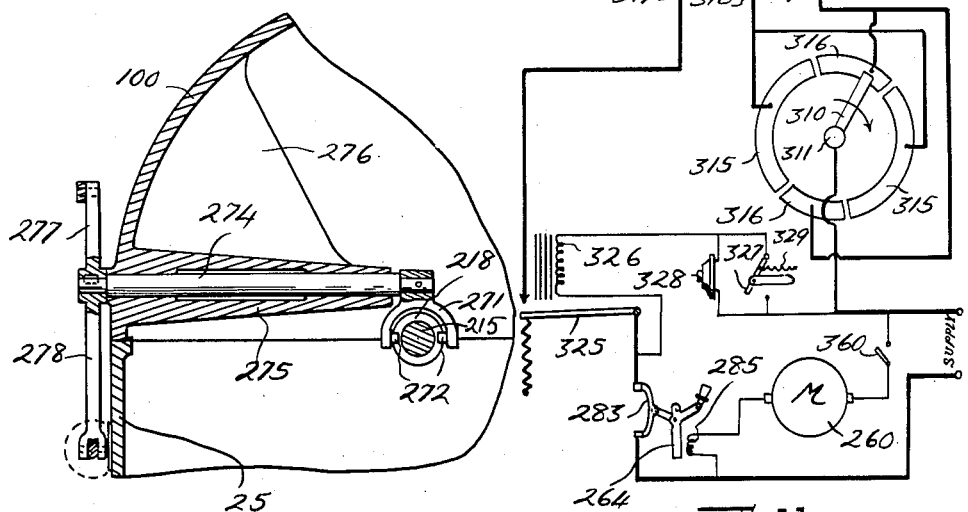

Figure 20 is a fragmentary vertical cross sectional view of a portion of the upper part of my machine taken substantially on the line 20—20 of Figure 1 and looking in the direction of the arrows, showing the clutch-operating mechanism for engaging the automatic chuck with its jaw-operating mechanism.

Figure 21:
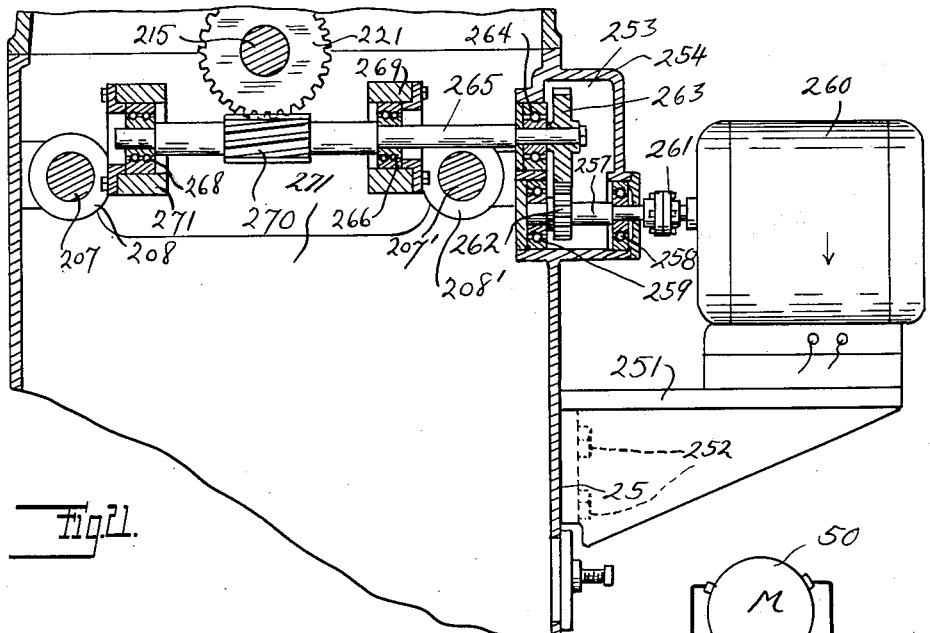

Figure 21 is a vertical fragmentary cross section taken substantially on the line 21—21 of Figure 1 and looking in the direction of the arrows.

Figure 22 is a schematic diagram of the electrical circuit I preferably employ for controlling the operation of my machine, and Figure 23 is a longitudinal sectional view showing the interior construction of an automatic speed-changing switch, which I employ for controlling the variable speed main drive motor.

Referring now to the drawings:

Reference character 25 indicates a supporting frame which may be cast of any suitable metal, and integrally with which cross members may be formed to serve as supports for the bearings and journals of the various movable members presently to be described.

The frame or housing is substantially rectangular in section, as will appear from an inspection of the drawings. The work to be operated upon is held by a rotatable chuck 30 carried by a shaft 31, one end of which is journaled in a roller bearing 32 carried by one wall of the frame. The other end of the shaft, which is reduced in diameter, is journaled in another roller bearing 33 supported by a cross-bracing wall 34 integral with the housing and running transversely thereof, (Figure 2). The shaft 31 is driven by means of the spiral gear 35, keyed or otherwise suitably secured thereon. The gear 35 may be formed of a bronze toothed ring bolted to a central web of cast iron or steel, as shown, although this is of course optional. The shaft 31 will be seen to be reduced in size in four steps, against the shoulder formed by the largest of which the bearing 32 is clamped by means of the lock nuts 36, screwed upon a threaded portion of the shaft, (see Figure 2). The spiral gear 35 is clamped against the next shoulder formed by the stepped reduction of the shaft by means of similar lock nuts 37; while the roller bearing 33 is smilarly positioned by means of the lock nuts 38.

The gear 35 is driven by the complementary spiral gear 40, carried by the shaft 41. As shown in Figure 3, the shaft 41 is journaled in ball bearings between a side wall of the housing 25 and a support 42 carried by a horizontal partition 39 extending between the sides of the housing. The gear 43, fast on the shaft 41 outside the frame, is driven by the pinion 44 on the drive shaft 45 (see Figure 1). The drive shaft, which is preferably journaled in ball bearings, as 119, 120, extends through the housing to project from its other side, carrying upon the projecting extremity the pulley 46 by means of which it is belt driven from the motor 50 mounted on top of the upper portion 100 of the housing, (Figures 1, 2, and 4). A plurality of V-belts 47 are shown employed for this purpose.

The motor 50 is mounted on a platform 295 arranged to be limitedly adjustable vertically, to enable tightening or loosening the belt 47 by adjusting the vertical positioning of the motor. The platform 295 is pivoted at one end on transverse pins 292 carried by upstanding lugs 291, cast integrally with the upper portion 100 of the housing, (Figures 1 and 2) as is also a sub-base 296 for the motor which extends outwardly from one side of the top of the housing a sufficient distance to support the motor and carry two of the lugs, as the top of the housing would not otherwise be of sufficient width, (note Figure 7). Beneath the other end of the adjustable platform 295 the top of the housing and the base 296 also carry two pairs of upstanding lugs, 293, transversely of each pair of which similarly extend pins 294. Pivotally carried by the pins 294 are eye bolts 297, (Figures 1, 2, and 7) which engage in notches 298 formed in the end of the platform. Nuts 299 and 300 are threaded upon each eye bolt, one above and one below the platform, adjustment of which serves to vary and fix the position of the motor as desired.

At its same end and adjacent the pinion 44 the drive shaft also carries another pinion 64, which is also fast upon it, and which drives a system of reduction gearing, engaging first the gear 48, which, coaxially with a pinion 49, which it drives, is mounted on the stub shaft 51, carried by the housing 25. The pinion 49 transmits motion to the unitary gear 52 and pinion 53, similarly mounted upon a stub shaft 54, also carried by the housing. Pinion 53 drives the gear 56, fast on the hollow shaft 63. The hollow shaft 63 carries a clutch face 64 at its inner end, as shown in Figure 4, which is formed with teeth or other irregularities which engage complementary teeth formed in the opposing face of the opposing clutch member 65. The opposing clutch member 65 is splined upon, to drive, the shaft 67, but is longitudinally slidable along the splined portion of the shaft, (the splined portion is designated 67') to engage and disengage the clutch. The portions 64 and 65 thus form a positive drive clutch, through which when the same is engaged, the shaft 67 may be driven by the gear 56.

The clutch may be engaged and disengaged by means of the operating handle 68, acting through the rod 69 and arm 70, which engages in a groove 65' in the clutch member 65, as shown in Figure 4. The operating lever is pivoted at 71 in projecting supports 74 carried by the casing 72, which casing is bolted to the housing 25 to cover the gears 43, 44, 64, 48, 49, 52, 53, and 56, as by bolts 73, (note Figures 4 and 5). As shown in Figure 4, the rod 69 is formed with a pair of spaced parallel discs 76—77 at its outer extremity, the discs lying in planes substantially perpendicular to the rod. Within the space between the discs fit pins or dogs 78 projecting inwardly from the spaced sides of the lever, the lever being formed with a central portion composed of a pair of branches spaced from each other, one passing on each side of the pair of discs, as shown in Figure 5. The pins 78 are freely slidable between the discs 76—77, and thus by movement of the handle, the rod 69 and operating arm 70 may be shifted inwardly or outwardly to engage or disengage the clutch. When the clutch is engaged, and the handle is consequently in the outwardly shifted position, as shown in Figure 4, it will be seen that the handle slants away from the casing 72 toward its top, and that its weight therefore tends to maintain the clutch in engaged position by urging the member 65 toward member 64.

A drum 75 carries cams for actuating various parts subsequently to be described. The drum is cylindrical, and is rotatable about a horizontal axis furnished by the shaft 80, to which it is secured, as by keys 82—83. The shaft is rotatably journaled in and supported by bearings 79—81, the former of which is carried by a drilled boss 88 cast integrally with the frame 25 at the opposite end from that supporting the chuck 30 and spindle 31; and the latter bearing (81) is carried by the bracing supporting wall 84, cast integrally with the housing 25. Thrust bearings of the ball type, (86—87) are provided at each end of the drum, (Figure 2).

The worm wheel 60, which drives the drum may, if desired, be formed similarly to worm wheel 35, that is, with a bronze toothed annulus (92) bolted or otherwise affixed to a supporting web, as 93, as by bolts 94. The worm wheel 60 is made fast to the drum by bolts 95, which secure the web 93 to the drum. It will thus be apparent that driving the worm 59 through the clutch formed by the members 64—65 serves to rotate the worm wheel 60 and cam drum 75.

To enable adjustment and proper positioning of the members controlled by the cam drum 75, especially when setting up the machine, it is desirable that it be possible to rotate the drum by hand to any desired position. Referring again to Figure 4, it will be seen that provision for such manual rotation of the drum has been provided by means of the shaft 57, which is keyed to the shaft 67, as by the key 97. Shaft 57 passes freely through the axial aperture in the hollow shaft 63, and projects from the housing 72, being formed with a squared end 96 for reception of a crank 98, by means of which the shaft 67, worm 59, and consequently the drum 75 may be turned by hand, when the clutch 64—65 is disengaged, (to avoid the necessity of at the same time reversely driving the reduction gearing and the motor 50).

In event any portion of the mechanism should jam, or anything interfere with the normal freedom with which the drum 75 is rotatable, it is desirable that a positive driving of the drum should not continue, as obviously damaging of the mechanism would result. I accordingly provide means for automatically disengaging the clutch 64—65 should anything interfere with the rotatability of the drum. The shaft 67 will be seen to be journaled in double ball bearings 99—101. The ball races are fixed in position with respect to the shafts 67, but the outer race of each is slidable in the bearing supports. The bearing supports comprise members 102 and 104, cast integrally with the frame 25 and the horizontal partition 103. The bearing 99 is fixed in position with respect to the shaft by the nut 105, which clamps it against a shoulder 106 formed in the shaft by reduction of the diameter of its end. The entire bearing 99 is freely slidable in the support 102, which is long enough to permit it, with the shaft 67. The bearing 101 is also slidable in the support 104, its inner race being clamped between a flange 116 carried by the shaft 67 and the nut 115, threaded upon its end. As shown in Figure 4, the support 104 is tubular, and is formed of such length as to permit housing the compression spring 85 at the end of the shaft. The spring bears outwardly against an adjustable stop carried by the wall of the frame, and yieldably maintains the shaft 67 in the desired central position in which the clutch member 65 may be engaged with the member 64 if desired, (which is of course the normal operating position of the clutch). The pressure of the spring 85 is exerted through a dished member 107, which is slidable in the tubular support 104 and yieldably clamps the outer race of the bearing 101 between its edge and the inwardly projecting flange 108 carried by the support 104.

The direction of rotation of the shaft 67 with respect to the teeth of the worm 59 and worm wheel 60 is such that resistance to rotation of the worm wheel urges the shaft in the direction of the arrow 109 of Figure 4, and against the pressure exerted by the spring 85. The normal direction of rotation of the shaft 67 is symbolically shown by the arrow 110 of Figure 4. The spring 85 offers sufficient resistance to such endwise movement of the shaft 67, however, so that it cannot take place under ordinary operating conditions, and it is only when the force required to drive the worm wheel 60 and drum 75, and the mechanism driven thereby, greatly exceeds that normally required, that such endwise movement occurs. When the resistance of the drum is sufficiently great, however, the rotation of the worm 59 forces it to move along or "climb" the worm wheel, forcing the shaft in the direction of arrow 109 and compressing the spring 85. The other end of the shaft 67, on which the floating clutch member 65 is slidably splined, carries the nut 111, or any other suitable enlargement engageable with the end, or a shoulder formed in the end, of the floating clutch member, as shown in Figure 4. Thus when the shaft 67 has moved to the right (in Figure 4) sufficiently, the nut 111 engages the clutch member 65 and draws it in the same direction, disengaging the clutch. The shaft 67 may be moved back to the normal operating position in which the clutch may be engaged, by turning it in the reverse direction by means of the crank 98. If then the restriction has been removed, the machine will operate in the normal manner, and the worm 59 will drive the drum, while if the contrary is true it will again immediately be forced along the worm wheel to disengage the clutch.

The adjustable stop for the spring 85 may comprise the adjusting screw 112 and lock nut 113, by means of which the stop 114 against which the spring bears may be moved longitudinally within the tubular support 104, and secured in any desired position. The end of the interior of the tubular support is formed as an opening in the frame 25 closable by a suitable cap 115 which is centrally apertured and tapped for reception of the adjusting screw, and secured in place in any suitable manner, as by machine screws 116. The spring is thus easily inspected or replaced.

To facilitate inspection or repair of the clutch mechanism and associated parts, the support for the bearings 61—62 is formed as a flanged sleeve 117, which may also be removably supported within an aperture in the frame, as by screws 118, (Figure 4). A removable inspection plate, 90 (Figures 1 and 5) is also positioned over an opening 121 in the side of the main housing frame 25, through which the cam drum 75 is accessible for adjustment or inspection.

A barrel cam is formed by securing guide plates 122 of desired contour to the cylindrical surface of the drum 75, as by screws 123. This cam is designed to impart rectilinear motion parallel to the axis of the drum. The upper portion 100 of the housing is, like the lower portion, formed as a relatively heavy casting, of sufficient strength to support and provide bearings for portions of the mechanism. As shown in Figure 2, the upper portion of the housing supports a shaft 125 in bearings 124—126. The shaft 125, which may if desired be made hollow, is in vertical alignment with the spindle 31, projects from the housing at the same end as does spindle 31, and carries fast upon its outer extremity the turret 130. The shaft 125 is slidable and rotatable in bearings 124—126. The turret is designed to hold certain of the tools which may be made to perform operations upon the work held by the chuck, and is horizontally reciprocable with its supporting shaft 125 by means of the barrel cam formed upon the drum 75; a follower comprising a wheel 127 being carried by the shaft, as shown in Figure 2. In order to permit rotation of the shaft 125 without affecting its reciprocation by the barrel cam, the follower 127 is carried by an annular member 128 encircling and freely rotatable upon the shaft. The annular member 128 carrying the follower is positioned between lock nuts 131 and a shoulder 129 formed upon the shaft, thrust bearings 132—133 being interposed. To prevent rotation of the annular follower carrying member 128, it is formed with a groove 134 longitudinally of its top surface, as is best shown in Figure 6, which is slidable along a fixed tongue 135, which engages in it. The tongue 135 is carried by the rear portion 140 of the upper part of the housing, the upper part of the housing being divided into two portions, 100 and 140, secured together and to the lower portion 25, as by machine screws 136, as shown in Figures 1 and 2. It will be seen that independently of whatever rotation may simultaneously be given the shaft 125, and independently of its position, it may be reciprocated by means of the cylinder cam formed by the drum 75 and the guides 122, the rate and extent of the reciprocation depending upon the angularity and positioning of the guide plates 122 and the rate of rotation of the drum. The purpose of the reciprocation is of course to feed the tools carried by the turret into and back them out of the work.

An adjustable stop 286, comprising a threaded screw with a hardened end, is carried by the upper rear portion 140 of the housing to limit the rearward movement of the turret shaft 125, being threaded in a tapped axial aperture in the flanged nipple 287, which is secured in an aperture in the housing by screws 288, engaging through the flange, as shown in Figure 2. A jam nut 289 is provided to secure the adjusting screw in the desired position. A hardened plug 290 is inserted in the rear end of the hollow shaft 125 for engagement with the hardened end of the adjusting screw. The track of the drum cam and the stop 286 are so adjusted relatively to each other that when the drum cam has moved the turret shaft rearwardly until the plug 290 engages the stop 286, it forces the plug against the stop with sufficient pressure to hold the turret rigidly in that position, while one of the tools it carries is performing a machining operation upon the work. This pressure is maintained during an interval of time, as the cam track dwells at the rearward position for a certain distance, and prevents any play in the mechanism affecting the rigidity of the tool-holding turret during this phase of the operation.

In the embodiment of my invention here shown, the machine is adjusted for the boring and facing of ring gear blanks. Accordingly one face of the hex turret carries the tool 137, which may be provided with boring cutters 138, and a reamer, 139, shown as of the floating type, (Figure 14). The tools are provided with uniform shanks which are clamped by means of clamping bolts 141 in a holder 142, which is secured to the turret, as by machine screws 143. Secured to the other side of the hexagonal turret diametrically opposite the tool holder 142 is a carrier member 144, having a substantially cylindrical extremity provided with an axial bore 146, into which is press-fitted a hardened steel master bushing 147. Into the master bushing is fitted another hardened steel bushing 148, which forms a pilot bushing, being adapted to register with and freely but accurately slide over a pilot or positioning rod 145 fixedly carried by the upper portion 100 of the housing, (note Figures 1, 2, and 8). Only the bushing 148 is subject to wear, and may be replaced without disturbing the accurate positioning of the master bushing 147. The method of securing the pilot rod 145 to the housing is clearly shown in Figures 1 and 2, comprising the tubular drilled support 149 carrying accurately positioned bearings 151—152, which also may be of hardened steel to assure their permanent accuracy of size and position. A set screw 153 may be used to fix but permit adjustment of the position of the rod. The rod may be slightly rounded or chamfered at its end to assure easy sliding of the bushing 148 over it.

The extent of the reciprocation of the turret induced by the drum cam 75 and the adjustment of the pilot rod are such that when the turret has moved outwardly away from the body of the machine to the limit of its travel, the bushing 148 has left the rod 145 and the turret is accordingly free to turn, as far as the rod is concerned.

As shown, the turret 130 carries another tool 154, held in a carrier 155, which may be similar to carrier 142, previously described. The tool shown is provided with two facing cutters 156, for facing the surface 157 of the work, which comprises the ring gear blank designated generally 158. The same tool may also carry two other cutters 159 and 160, for chamfering the edges of the already bored hole in the blank, (Figures 18 and 19). Figure 7 shows the relative position of attachment of the holder 155 and tool 154 to the turret.

Indexing of the turret, to bring the boring tool and the facing tool into alignment with the work at the proper times, is controlled by the face cam 165, carried by one end of the cylinder 75, the cam being secured to the drum by machine screws 161. The cam follower 162, which may be of the roller type, is carried by the lever arm 163, which is formed integrally with a sector gear 164, the two being carried by and fulcrumed upon the stub shaft 166, which is supported by the frame 25, being driven into a drilled hole in the boss 167, (Figures 1 and 6). The sector gear 164 actuates the pinion 168, which is fast on the shaft 170. Shaft 170, which extends substantially the length of the frame, is journaled in plain bearings in a bracket 169 upstanding from and secured to the rear of the lower portion 25 of the housing inside the cover portion 140, and in a bracket 171 within the forward portion 100 of the upper part of the housing, as shown in Figures 1 and 4.

The shaft 170 carries fast upon it the sector gears 172, 173, adapted to mesh at different times with the gears 174—175 carried by the turret shaft 125. When the turret shaft has been moved outwardly longitudinally so that the turret is as far from the body of the machine as possible, (at which time the tools are clear of the work, and the pilot bushing is clear of the pilot rod 145) the gear 174 carried by the turret shaft meshes with the sector 172. The cycle of operation of the device is such that at this time the face cam 165 actuates the shaft 170, through the follower 162, sector 164, and gear 168, sufficiently to turn the turret shaft and turret to bring either the boring tool or the facing tool into alignment with the work, depending upon the phase of the operating cycle in which the machine is at that time engaged.

Assuming that the actuation of the cam brings the boring tool into alignment, the track 165′ of the cam 165 dwells long enough in that position to allow the drum cam formed by the guides 122 to draw the turret, by means of its shaft, inwardly until the sector 172 and gear 174 are disengaged. Before they are completely disengaged, however, the pilot bushing 148, which is aligned with the pilot rod simultaneously with alignment of the boring tool with the work, has partly slid over the pilot rod, thereby maintaining the tool alignment while the drum continues to draw the turret inwardly and feed the boring tool and reamer into the work, insuring their traveling a rectilinear path.

The drum cam then backs the boring tool from the work, and when the turret has moved outwardly a sufficient distance, the gear 174 on the turret shaft is again engaged with the sector 172 carried by the shaft 170. During the interval, the face cam 165 has turned sufficiently so that it is now prepared to actuate the shaft 170, and consequently the sector 172, sufficiently to turn the turret and its shaft to bring the facing tool into alignment with the work. The drum cam then draws the turret and its shaft inwardly. At this time, however, the pilot rod 145 is not effective, since the bushing 148 is no longer in alignment with it. Accordingly, the gear 175 carried by the turret shaft is formed with notches 176 cut into otherwise inoperative portions of its periphery, substantially parallel to the axis of the turret shaft. A fixed tongue 177, supported by the upper portion 100 of the housing, is adapted to slidably engage within the notches or grooves 176 to maintain the turret shaft, and consequently the turret, in the proper position while the gear slides along the tongue. The tongue is so positioned longitudinally of and within the frame, that it engages within the notch before the gear 174 is completely disengaged from the sector 172. It might be remarked that the tongue is of course also engaged in one of the notches 176 while the pilot rod and bushing are engaged, but at that time the tongue and gear slots serve no particular function. Continuing the description of the machine's operation; the turret is moved inwardly by the drum cam while the facing tool is maintained in substantial alignment with the work by the tongue and slots just described. The overall diameter of the facing tool is sufficiently small to permit it to pass through the bored aperture in the blank. As the gear 175 comes into mesh with the sector 173, which it does as the facing tool enters the work, the slot 176 leaves the tongue 177, and the turret shaft is then free to be again subject to actuation by the face cam 165, through the agency of the sector 173 and gear 175. The track 165′ of the face cam is at this phase of the operation contoured to impart an oscillating or rocking movement to the turret shaft, the facing tool being then within the aperture with the cutters positioned substantially as in Figures 18 and 19, that is, substantially horizontal, and pointed laterally of the machine.

As the facing tool depends a considerable distance below the axis of the turret shaft, the rocking motion moves the tool inwardly and outwardly over the surface 157, to face the same. Since the movement is quite slow compared to the rate of rotation of the work, the chamfering tools are engaged with the work a sufficient length of time to finish the edges of the aperture. The cam 165 then again moves the tool to a central position with respect to the aperture, and the drum cam backs it off, the tongue 177 engaging one of the slots 176. When the turret has been backed off sufficiently, the slot 176 and tongue 177 are again disengaged, while the gear 174 meshes with the sector 172, whereupon the face cam 165 is prepared to turn the turret shaft to align the boring tool with the work, and the cycle of operation is ready to recommence after a new blank has been inserted in the chuck 30. It will be observed that the positioning of the turret shaft and its gears on the one hand, (by tongue 177 and pilot rod 145) and the positioning of the sector gears on the other, (by means of the face cam 165), serves to align the teeth of the sectors and gears so that they may readily slide into mesh.

For performing other operations upon the work independently of the tools carried by the turret, facing tools 178 and 179 are mounted in reciprocating carriers upon the head of the machine in a manner enabling their engagement upon reciprocation, with the surface 181 of the ring gear blank, to face the same. The construction and positioning of these tools, and their carriers, are best shown in Figures 1, 7, 11, and 12. The tool holders may be made alike, and are so shown, and mounted as shown in Figures 1 and 7, being designated generally 182 and 183. A description of one will therefore suffice. Each comprises a frame 180, affixed to the main housing 25, as by machine screws 184; the housing having a dovetailed slot extending longitudinally of its top surface, within which slidably fits the complementarily formed base of a tool-supporting carriage 185, (Figures 7 and 11). As shown, the tool is secured to the carriage by means of bolts 186 and nuts 187, the heads of the bolts being countersunk into the dovetailed base of the carriage. The cutting edge, replaceably and adjustably carried by the tool in the customary fashion, is designated 188. The bolts 186 extend through slots 191 in the tool, to enable adjustment of the tool longitudinally of the carriage upon loosening the nuts 187. To render such adjustment more convenient, an upstanding abutment 192 is formed upon the carriage 185, having a drilled aperture therethrough extending substantially longitudinally of the carriage, which direction is of course substantially that in which the advancement and retraction of the tool takes place. Rotatable in the aperture in the abutment is the adjusting screw 195, which is formed with collars 193—194 on each side of the abutment, a squared projecting end 196 over which a socket wrench may be slipped to turn the screw, and with a threaded extremity 197 engaging in a suitably tapped aperture in the tool, to enable longitudinal movement thereof with respect to the carriage upon turning the screw.

The interior of the frame 180, which supports the tool carriage, is hollow, as shown in Figure 11; and a rack 190, carried by the carriage 185, extends thereinto. Machine screws 189 are shown securing the rack to the carriage, although obviously it might be cast integrally therewith, or secured in any other suitable fashion. The teeth extend longitudinally of the base of the carriage, in a plane perpendicular thereto, as shown in Figures 11 and 12.

Meshing with the rack 190 is a pinion 200 fast upon a shaft 198, which is journaled in ball bearings 199—201 carried by a tubular bearing support 202. The tubular support is flanged, as at 203, and the flange is secured to the housing 25 by means of machine screws 206, with a portion of the tubular bearing support extending into the housing, through an aperture 204 therein. The shaft 198 projects beyond the support into the housing, and carries the pinion 205 fast upon its inner extremity. It will be apparent that rotation of the pinion 205 will serve to move the tool toward or away from the work.

Each of the tool holders 182—183 has therefore a pinion 205 extending into the interior of the housing 25, actuation of which serves to reciprocate the tools 178—179. The pinions 205 are motivated by sector gears 206—206', each sector gear being secured to a shaft (207—207') journaled longitudinally of the housing, one on each side of the main spindle 31, as shown in Figures 3 and 5. At the head end of the machine the shafts 207—207' are journaled in apertures in the housing. They extend rearwardly to a point near but spaced from the drum 75, each shaft being supported at a point spaced from its end by a bracket 208—208' carried by, and here shown as cast integral with the frame.

The end of the drum adjacent which the shafts 207—207' terminate, which is the opposite end of the drum from that carrying the face cam 165, carries another face cam, designated 210, the track 210' of which is contoured to impart a slow advancing movement to the tools 178—179, and a relatively quick return, (Fig. 10). The cam followers comprise rollers 209—209', engaging in the track 210', and each carried by an arm, 211—211', secured to the ends of the shafts 207—207' by means of integral split collars 212—212'; the collars being clamped to the shafts by means of clamping nuts 213—213' and bolts 214—214'. Thus as the drum rotates, the face cam 210 rocks the shafts 207—207', which reciprocate the tools 178—179 through the sectors 206—206', pinions 205, 200, and racks 190. The surface 181 of the blank (Figure 18) is therefore being faced simultaneously with the performance of the other operations upon the blank by the turret-carried tools, previously described.

During those periods of the machine's operation in which none of the tools are being fed into the work, that is, while the turret-carried tools are being backed off or indexed, and the independent angularly disposed tools 178—179 are also clear of the work, it is desirable that the entire operation of the machine be speeded up to cut down waste time. In the arrangement of tools and parts herein shown this occurs twice during the cycle of operation. To this end the motor 50 may be provided with two speeds. The speed of the motor is controlled by an automatic switch 89 driven by the shaft 80 which carries the cam drum 75. The switch may be of any suitable form, being here shown as comprising a rotatable brush 310 fast upon a small shaft 311 journaled in the switch casing, which is secured to the housing 25 by screws 320. The brush and its supporting shaft are driven by the shaft 80, as aforementioned, being here shown as driven at the same speed as the cam drum through mitre gears 312—313, the gear 312 being rigidly carried by the end of the shaft 80, as by being formed with or rigidly affixed to a pin 314 tightly driven into a suitable axial aperture in the end of the shaft, which projects through the housing, as shown in Figure 2. The gear 313 drives the shaft 311 which carries the brush 310, (Figure 23). The brush slidably engages electrical contacts arranged in a hollow ring as insulated commutator segments within the switch casing. The arrangement of the segments, and of the current supply to the motor, is schematically shown in Figure 22, the wiring being such that when the brush 310 contacts either of the segments 315, the motor is fed through wires 317 and 318, and runs at low speed: while when the brush is contacting either of the segments 316, the motor is fed through lines 317 and 319, and runs at high speed. It will be remembered that the drum 75 and its supporting shaft complete one revolution for each complete cycle of operation of the machine. It is therefore only necessary to so arrange the switch segments that the brush will engage those which feed the high speed windings of the motor during those phases of the operation when the tools are free, and the low speed windings when they are engaging the work.

The chuck which holds the work may also be power operated, and I have shown it as such. For this purpose the main spindle 31 is hollow, as shown in Figure 14, and a shaft 215 extends through the axial aperture, being freely rotatable independently of the shaft 31. The main shaft 31 terminates adjacent the lock nuts 38 which position the bearing 33. A flange 216 is secured to the end of the hollow shaft 31 by means of screws 217, as shown in Figure 14. As there shown, the shaft 215 projects beyond the hollow spindle 31, and carries slidably splined upon its end the clutch member 218, through which the shaft 215 may be driven. The positioning of these members with respect to the machine as a whole will be understood upon reference to Figure 2. The clutch member 218 is secured against sliding off the end of the shaft by the nut 219. A cooperating clutch member 220 is mounted and freely rotatable upon the shaft 215, and carries the worm wheel 221, which is rigidly secured to and rotates as a unit with the clutch member 220. The structurally unitary clutch member 220 and worm wheel 221 are positioned, by a pin 222, between the pin and the flange 216, independently of both of which, however, they are freely rotatable. The two clutch members 218—220 are formed with complementary teeth which may be positively engaged when the member 218 is slid sufficiently toward the member 220; which latter is of course fixed with respect to its longitudinal position upon the shaft while free to rotate, while the clutch member 218 is fixed on the shaft with respect to rotatability, but free to slide longitudinally. A double ball bearing 223 journals and supports the shaft 215 within the hollow spindle 31 at the clutch end. As shown in Figure 14, the bearing is positioned by clamping the inner race between a nut, 226, and a shoulder 224 formed on the shaft 215.

The end of the shaft 215 nearest the chuck is terminally reduced and formed with splines, as at 225, which drive a sleeve 227, internally splined for engagement with the splined end 225 of the shaft 215. The sleeve 227 is journaled in ball bearings 228—229, and carries the sun gear 230, which is here shown as integral with the sleeve, and which gear is therefore drivable independently of the spindle 31 by means of the shaft 215.

The hollow spindle 31 carries a flange 231 at its end to support the chuck, to which the latter is secured by means of the machine screws 232. The part of the chuck directly held by the screws 232 is the back plate 233, to which an enclosing and supporting shell 235 is rigidly affixed by screws 234. As shown in Figures 15 and 16, the shell encloses the cylindrical side surface of the chuck, and also its entire front face, excepting for the portion of the face which is cut away to form radial slots in which the chuck jaws slide, as will be more fully explained hereafter.

Meshing with the sun gear 230 are four planetary gears 240 which are rotatable on axes fixed with respect to the chuck, being journaled on ball bearings 236 carried by stub shafts 237. The shape of the stub shafts, which of course need not be rotatable with respect to the chuck, appears in Figure 15, each being in the form of a headed pin 237, with its headed end engaging in the back plate 233, while its other extremity engages in a suitable aperture in a portion of the shell 235. As shown in Figure 17, the four planetary pinions 240 are equally disposed about the sun gear 230, and mesh in turn with an internal ring gear 250; from which it will be seen that when the sun gear 230 is driven in a different direction or at a different rate of speed from the chuck, which is rotated by spindle 31, the rotation of the sun gear with respect to the chuck will drive the internal ring gear 250 through the planetary gears 240. Normally the chuck itself is at rest when the sun gear is driven.

A supporting sleeve 238 is carried by the chuck to support the bearing 228, in which one end of the sleeve 227 is journaled, the supporting sleeve being formed with a flange 239 at its end which is secured to the back plate 233 by the stub pins 237 on which the planetary gears are journaled. The other ball bearing carrying the sleeve 227 is supported in a suitably cut away portion of the shell 235.

The internal ring gear 250 is secured, as by machine screws 241, to an annular scroll gear 255, the spiral-cut teeth of the scroll facing the front of the chuck and away from the internal gear. The scroll and internal ring gear are freely rotatable independently of the chuck, as a unit. The chuck jaws 242 are reciprocable in radial slots 243 in the face of the shell 235 of the chuck, each jaw being made in two parts, the rear part being the portion directly engaging the slot, being held therein by lateral tongues 244 (Figure 2) formed in the shell of the chuck, which engage in grooves in the sides of the chuck jaw. The front portion of each jaw member, which carries the jaw itself, is more specifically designated 246, while the rear portion, to which the front portion is secured by machine screws 248, is designated 247. The back face of each rear jaw portion 247 is formed with lateral arcuate teeth 249 shaped to engage those of the scroll 255, so that upon rotation of the scroll with respect to the chuck, the scroll moves the chuck jaws simultaneously inwardly or outwardly, depending upon the direction of the relative rotation.

The independent rotation of the shaft 215 which is possible when the clutch members 218—220 are engaged is secured by means of an electric motor 260, mounted on a bracket 251 secured, as by cap screws 252, to the same side of the housing 25 from which projects the driving pulley 46. As shown in Figure 21, a gear housing 253 is formed in the side of the main housing 25, over which a cover plate 254 is secured. A short shaft 257 is journaled in ball bearings 258 and 259 between the cover plate and the depression cast in the main housing to form the body of the gear housing. The shaft 257 is driven by the motor 260 through the coupling 261, and carries fast upon it the pinion 262, which drives the gear 263, fast upon shaft 265, which terminates in the gear housing 253, and extends into the main housing 25, being journaled in three ball bearings, 264, 266, and 268. The inner bearings, 266—268, are mounted in supports 269—271 carried by a bracing partition 267 within the main housing which also serves to connect and reinforce the brackets 208—208', (note Figure 5). Fast on shaft 265 is mounted the worm 270, which meshes with the worm wheel 221, enabling driving the chuck-operating shaft 215 thereby when the clutch 218—220 is engaged, as shown in Figures 14 and 20. The reason I prefer to drive the shaft 265 through the pick-off gears 262—263, rather than by a direct drive from the motor, is to enable changing the gears in event it becomes desirable to change the speed at which the chuck jaw operating mechanism is driven. The motor 260 is of the reversible type, to enable moving the chuck jaws in either direction by merely reversing the motor.

The slidable member 218 of the clutch I preferably throw by means of the yoke 271, carrying dogs 272 for engagement within a groove 273 formed in the body of the clutch member. The yoke is fast upon an operating rod 274 fulcrumed in an elongated boss 275 cast integrally with the upper portion 100 of the frame. A reenforcing web 276 may also be cast between the boss and the upper curved portion of the housing, as shown in Figure 20. The rod 275 terminates outside the housing, where it carries a double armed lever, the arms of which are designated 277 and 278. The short arm 277 is connected by a link 279 with a manually operable control handle 280, which is fulcrumed on a pin 281 carried by the lower portion 25 of the frame. It is obvious that throwing the lever 280 to the left, (note Figure 1) will throw the yoke 271 (Figures 2 and 20) in the opposite direction, and engage the clutch member 218 with the member 220, (Figure 14)

Since it is desirable that the main motor 50 be not driving the main portion of the mechanism while the chuck-operating mechanism is in motion, for the reason that upon the jaws of the chuck reaching the limit of their travel, the main driving spindle would act to drive the spindle 215, and consequently injure the driving mechanism of the latter; the lever arm 282 is formed integrally with the arm 280, and actuates a circuit breaker 283 in series with the motor 50. The switch 283 is so arranged that it is thrown to off position when the lever arm 280 is moved to the left, thereby preventing starting the main motor while the clutch 218—220 is engaged.

A magnetic solenoid 285 is mounted on the side of the frame 25, and is arranged in series with the motor 260 which operates the chuck jaws. The slidable core 264 of the solenoid is pivotally affixed to the lever arm 278, which is shown as integral with the lever 277. Upon closing the circuit to, and starting the motor 260, therefore, the solenoid is energized and draws inwardly the core 264, throwing the yoke 271 to the right and engaging the clutch. This action, through the link 279, simultaneously throws the lever 280 to the left, and 282 to the right, opening the circuit breaker 283 and stopping the motor 50, if it has not previously been stopped by the operator.

The motor 260 is controlled by an independent switch, (360 in Figure 22).

When not limited by the automatic operation of the circuit breaker 282 (controlled by the circuit to the chuck motor 260 and the clutch operating mechanism, as above described) the main driving motor 50 is started and stopped by a magnetic switch 325 which is interposed in series between the circuit breaker 283 and the motor 50, as shown in Figure 22. The solenoid of the switch, designated 326, must be energized to maintain the switch in closed position. Energization of the solenoid to close the magnetic switch may be accomplished either by means of a manually operable push button 328, which closes the circuit to the solenoid only while it is held down, or by an automatic switch 327 mounted inside the frame 25 adjacent the drum 75 (Figures 6, 10, and 22). This switch, as indicated in Figure 22, is shunted across the push button, both being in series with the supply to the solenoid 326, and the switch is arranged to be yieldably maintained in closed position, as by a spring 329, and to be opened only when a shoe 330, carried by the periphery of the drum engages it, at which time the motor 50 is thereby stopped unless the push button is being held down, as the current to the solenoid of the magnetic switch 325 is broken and it thereupon opens. The shoe is so disposed upon the drum with relation to the switch that it engages the operating arm of the switch (designated 331) upon each completion of a full revolution by the drum and consequently a full cycle of operation by the machine, and the machine is thus automatically stopped. To again start the machine, which is usually desired after new work has been placed in the chuck, it is merely necessary to depress the push button 328 long enough for the shoe 330 to leave the operating arm 331 of the switch, at which time it will spring to closed position and so maintain itself until again opened by the shoe upon the completion of another revolution by the drum. The push button 328 and the magnetic switch 325 may be mounted in a single casing affixed to the side of the frame at a convenient point, as shown in Figure 1.

A chip catcher 301 may be arranged beneath the chuck, as shown in Figures 1, 2, and 7, provided with a chute 302, for conducting the scrap to either a receptacle or a conveyor. The catcher is shown affixed to the housing 25 by bolts 304 engaging through lugs on one side, and by cap screws 303 on the other.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

I claim:

1. In a machine tool construction, a frame comprising separable lower and upper sections, a work shaft longitudinally journaled in said frame substantially at the juncture of said sections, driving means for the work shaft including a transverse driving shaft journaled in the lower section, a similarly transversely disposed worm shaft geared to the work shaft, pick off gearing coupling the driving and worm shafts, tool-carrying elements carried by the upper section and movable toward and from the work shaft, and means for controllingly moving the tool carrying elements including a drum cam journaled in the lower section of the frame, follower portions supported by the upper section and engaging said cam, and means for driving the cam including additional pick off gearing meshing with the first mentioned pick off gearing.

2. In a machine tool, a frame comprising separable lower and upper sections, a work shaft longitudinally journaled in and projecting from the frame and carried by the lower section thereof, driving means for turning the work shaft including a drive shaft also journaled in and projecting from the lower frame section, an idler shaft also journaled in and projecting from the lower frame section and geared to the work shaft, pick-off gearing connecting said idler and drive shafts and arranged on the projecting ends thereof, tool carrying means carried by the upper frame section and movable toward and from the projecting extremity of the work shaft, cam means journaled in the lower section for controllingly moving said tool carrying means, means including additional pick-off gearing also connected to said drive shaft for driving the cam means, and driving means for the tool carrying means separably connecting said tool carrying means and the cam means including a follower carried by the upper section and projecting into engagement with the cam means.

3. In a machine tool, a frame comprising separable lower and upper sections, a work shaft longitudinally journaled in and projecting from the frame and carried by the lower section thereof, driving means for turning the work shaft including a drive shaft also journaled in and projecting from the lower frame section, an idler shaft also journaled in and projecting from the lower frame section and geared to the work shaft, pick-off gearing connecting said idler and drive shafts and arranged on the projecting ends thereof, tool carrying means carried by the upper frame section and movable toward and from the projecting extremity of the work shaft, cam means journaled in the lower section for controllingly moving said tool carrying means, means including additional pick-off gearing also connected to said drive shaft for driving the cam means, and driving means for the tool carrying means separably connecting said tool carrying means and the cam means including follower means engaging the cam means, and intermeshing gearing connected to said follower means and carried partly by each section, that portion of said gearing carried by the upper section being connected to the tool carrying means and that portion thereof carried by the lower section being connected to the follower means.

4. In a machine tool, a frame comprising separable lower and upper sections, a work shaft journaled in and projecting from the lower section of the frame, driving means for turning the work shaft including a drive shaft also journaled in and projecting from the lower section of the frame, an idler shaft also journaled in and projecting from the lower frame section and geared to the work shaft, pick-off gearing connecting said idler and drive shafts and arranged on the projecting ends thereof, a plurality of tool holding means carried by the upper frame section and movable toward and from the projecting extremity of the work shaft, means including a plurality of unitarily movable cams journaled in the lower section and projecting into the upper section for controllingly and independently moving said tool holding means.

5. In a machine tool construction, a frame, a work shaft journaled therein, a tool holding turret shaft also journaled and slidable in the frame in spaced but substantially parallel relation to the work shaft, means for rotating the work shaft, and means for independently rocking and sliding the turret shaft, including a cam drum journaled in the frame on an axis substantially parallel to both said shafts, a cam carried by the periphery of said drum, follower means connected to the turret shaft and engaging said peripheral cam to slide said shaft, a plate cam carried by the end of said drum, and follower means engaging said plate cam and also connected to said turret shaft to rock the same.

6. In a machine tool, a frame, a work shaft journaled therein, a tool holding turret shaft also journaled and slidable in the frame in spaced but substantially parallel relation to the work shaft, means for rotating the work shaft including a driving shaft and an idler shaft both projecting from the frame, pick-off gears carried by said projecting shaft ends and coupling said shafts, and means for independently turning and sliding the turret shaft, including a cam drum journaled in the frame on an axis substantially parallel to both said shafts, a cam portion carried by the periphery of said drum, follower means connected to the turret shaft and engaging said peripheral cam portion for sliding said shaft, a flat cam carried by the end of said drum, follower means engaging said plate cam and also connected to said turret shaft to turn the same, and means for turning the drum including a shaft connected thereto and projecting from the frame in substantially parallel spaced relation to said driving and idler shafts, and means including additional pick-off gearing connecting said drum-connected shaft and the driving shaft.

7. In a machine of the character described, a frame, a work shaft rotatable therein, a turret shaft rotatable and slidable in the frame adjacent but spaced from the work shaft, a turret carried by the turret shaft, means for sliding the turret shaft to feed tools carried by the turret toward and from the work shaft, means for turning the turret to bring other tool stations into feeding position, means for guiding sliding movement of the turret toward and from the work when turned to one position, including a pilot pin carried by the frame and adapted to interfit with an apertured guiding portion connected to the turret, means for rocking the turret when turned to another position to oscillate a tool carried thereby relatively to the work, said last named means including a gear carried by the turret shaft, another gear into and out of which with which said first mentioned gear may be moved by sliding the turret shaft, and additional means for guiding sliding movement of the turret shaft when the turret is turned to a position in which the pilot pin and aperture of said first mentioned guiding means are disaligned, said additional guiding means comprising interfitting key and keyway portions connected one to the frame and the other to the turret shaft and of such length that they separate as said gears slide into mesh to free the turret shaft for rocking movement.

8. In a machine of the character described, a work shaft rotatable therein, a turret shaft rotatable and slidable in the frame adjacent but spaced from the work shaft, a turret carried by the turret shaft, means for sliding the turret shaft to feed tools carried by the turret toward and from the work shaft, means for turning the turret to bring other tool stations into feeding position, means for guiding sliding movement of the turret toward and from the work when turned to one position including a pilot member carried by the frame and adapted to interfit with an apertured guiding portion connected to the turret, means for rocking the turret when turned to another position in which said pilot member and apertured guiding portion are disaligned to oscillate a tool carried by the turret relatively to the work, said last named means including a gear carried by said turret shaft, and a rocking gear into and out of mesh with which said first mentioned gear may be moved by sliding the turret shaft, and keying means for guiding said gears into mesh and holding the turret shaft against undesired turning during such sliding movement but before the gears are engaged, including cooperating key and keyway portions one connected to the turret shaft and the other to the frame, and slidable clear of each other as the gears slide into mesh at one extremity of sliding movement of the turret shaft, and also movable out of engagement to free the turret shaft for turning movement as the latter approaches the other end of its sliding travel.

WILLIAM SINCLAIR.